United States Patent [19]

Kunas

[11] Patent Number: 5,641,529
[45] Date of Patent: Jun. 24, 1997

[54] EXTRUSION APPARATUS AND METHOD FOR PRODUCING THREE-DIMENSIONAL SHAPES

[75] Inventor: Kurt T. Kunas, Wauconda, Ill.

[73] Assignee: The Quaker Oats Company, Chicago, Ill.

[21] Appl. No.: 404,795

[22] Filed: Mar. 15, 1995

[51] Int. Cl.⁶ .............................. A23P 1/00; B29C 47/00
[52] U.S. Cl. ........................ 426/516; 264/167; 425/311; 425/381; 425/382.2; 425/465
[58] Field of Search ............................ 426/516, 518; 425/381, 465, 310, 311, 382.2; 264/167

[56] References Cited

U.S. PATENT DOCUMENTS

| | | | |
|---|---|---|---|
| 3,825,391 | 7/1974 | Davis | 425/362 |
| 4,240,779 | 12/1980 | Turk | 425/313 |
| 4,802,838 | 2/1989 | Schaaf | 425/313 |
| 4,900,572 | 2/1990 | Repholz et al. | 426/282 |
| 4,954,061 | 9/1990 | Repholz et al. | 425/131.1 |
| 5,250,314 | 10/1993 | Jones | 426/512 |
| 5,435,714 | 7/1995 | Van Lengerich et al. | 425/311 |

FOREIGN PATENT DOCUMENTS 09645  6/1993  WIPO .................. A21C 3/04

Primary Examiner—George Yeung
Attorney, Agent, or Firm—Mart C. Matthews; Lars S. Johnson

[57] ABSTRACT

An extrusion apparatus for producing thee-dimensional objects comprises at least one die, an extruder, and a rotatable cutter plate. The die is disposed adjacent to an outlet end of the extruder. The die forms an opening defining a two-dimensional shape, and the extruder forces an extrudable material through the opening in the die. The rotatable cutter plate is disposed adjacent to the die. The cutter plate is configured to obstruct different portions of the die opening at different times as the cutter plate rotates so as to vary the shape of the extrudable material forced through the opening in the die and thereby create a three-dimensional shape. The cutter plate is configured to fully obstruct the opening in the die during each revolution of the cutter plate so as to separate the extrudable material forced through the opening in the die into individual objects.

3 Claims, 4 Drawing Sheets

EXTRUSION APPARATUS AND METHOD FOR PRODUCING THREE-DIMENSIONAL SHAPES

FIELD OF THE INVENTION

The present invention relates to an apparatus and method for producing three-dimensional objects via extrusion. In a preferred embodiment, the invention relates to an improved apparatus and method for producing three-dimensional objects by extruding material capable of being molded or of receiving form through a die and shaping the resultant form into three dimensions with a rotating cutter plate.

BACKGROUND OF THE INVENTION

In numerous commercial applications, it is desirable to mass produce a variety of identifiably shaped three-dimensional objects. For example, in the food industry it is frequently desirable to produce food items such as crackers, cookies, snacks, pet foods, pasta and confections that are in the form of animals, letters, vehicles, etc.

Designing and producing edible items in a specific shape is often an inherent part of a marketing strategy of a company, and product shape often plays a crucial role in consumer identification of a food product. In the pet food industry, in particular, it is common practice to produce products in which the food items are produced in a highly recognizable abstract shape or a shape representing a typical food for a pet such as bone-shaped "treats" for dogs or fish-shaped "treats" for cats.

A variety of methods exist in the art to produce three-dimensional objects from material that is capable of being extruded or formed and then solidified. For example, many products such as toys and game pieces are formed via injection molding.

Three-dimensional food items are commonly formed via some sort of extrusion technique. For example, complex shaped pasta products such as shells, rotini, and the like are typically formed by extruding the pasta gluten through an orifice or die using differential pressure so that one portion of the pasta material is extruded faster than an adjoining portion. This differential pressure causes three-dimensional twisting and curling of the resulting pasta product. This sort of extrusion technique, however, does not allow fine control of the shape of the resultant product and thus does not allow the creation of identifiable tangible three-dimensional objects such as those in the likeness of animal shapes or letters.

Van Lengerich et al. have described in International Patent No. WO 93/10662 a method of producing farinaceous-based food products in the shape of animals. Dough is extruded through a multi-port extrusion die and cut by two distinct sizes of knives mounted on a continuous or oscillating cutter. Two knives pass over each extrusion port in sequence as the dough is being extruded. The first and shorter of each pair of knives passes across only a portion of each of the die ports, partially cutting each of the extrudate ropes of dough. The second and longer knife of each pair completely cuts each of the partially cut extrudate ropes into individual identifiable pieces. Utilizing this method, one can produce three-dimensional confectioneries which have, for example, individual identifiable subparts such as legs or wheels. Such objects however are little more than base-reliefed two-dimensional forms and are not free standing. In addition, such an extrusion and cutting assembly is not readily capable of being modified to produce alternative shaped objects.

Therefore, there is a need for an apparatus and method capable of producing objects of "true" three-dimensional design which is readily re-toolable to produce a variety of designs.

SUMMARY OF THE INVENTION

The present invention provides an apparatus and method for producing three-dimensional objects via extrusion. More particularly, the apparatus of the present invention allows for the extrusion of complex free standing three-dimensional objects by first extruding material through a die or die openings which roughly define the shape of the material in two dimensions and second configuring the extruded material with a rotating slotted cutter plate which shapes the material into complex three-dimensional form.

In one embodiment, an extrusion apparatus for producing three-dimensional objects comprises at least one die, an extruder, and a rotatable cutter plate. The die is disposed adjacent to an outlet end of the extruder. The die forms an opening defining a two-dimensional shape, and the extruder forces an extrudable material through the opening in the die. The rotatable cutter plate is disposed adjacent to the die. The cutter plate is configured to obstruct different portions of the die opening at different times as the cutter plate rotates so as to vary the shape of the extrudable material forced through the opening in the die and thereby create a three-dimensional shape. The cutter plate is configured to fully obstruct the opening in the die during each revolution of the cutter plate so as to separate the extrudable material forced through the opening in the die into individual objects.

In a preferred embodiment, the cutter plate forms a peripheral slot having a plurality of sections of variable width and length. The plurality of sections of the peripheral slot are configured and arranged to expose different portions of the die opening at different times as the cutter plate rotates so as to vary the shape of the extrudable material forced through the opening in the die and thereby create a three-dimensional shape. The cutter plate includes a solid portion configured and arranged to fully obstruct the opening in the die during each revolution of the cutter plate so as to separate the extrudable material forced through the opening in the die into individual objects.

BRIEF DESCRIPTION OF THE DRAWINGS

Other objects and advantages of the invention will become apparent upon reading the following detailed description and upon reference to the drawings in which.

Figure 1:
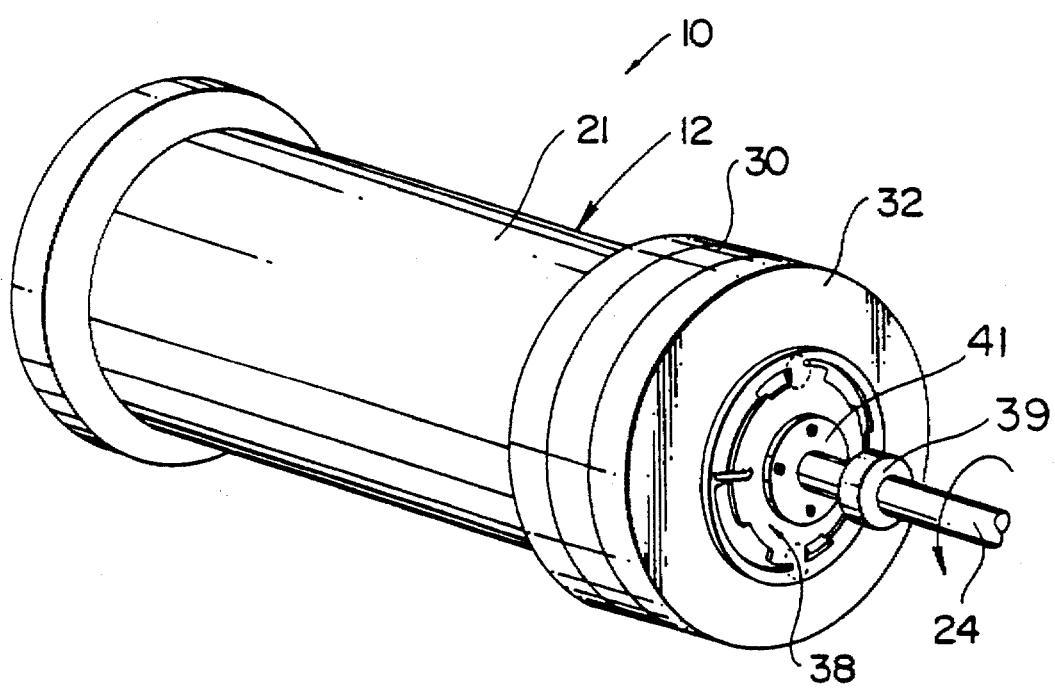
FIG. 1 is a perspective view of an extrusion apparatus embodying the present invention.

While the invention is susceptible to various modifications and alternative forms, a specific embodiment thereof has been shown by way of example in the drawings and will herein be described in detail. It should be understood, however, that it is not intended to limit the invention to the particular forms disclosed, but on the contrary, the intention is to cover all modifications, equivalents, and alternatives falling within the spirit and scope of the invention as defined by the appended claims.

DESCRIPTION OF THE PREFERRED EMBODIMENTS

Figure 2:
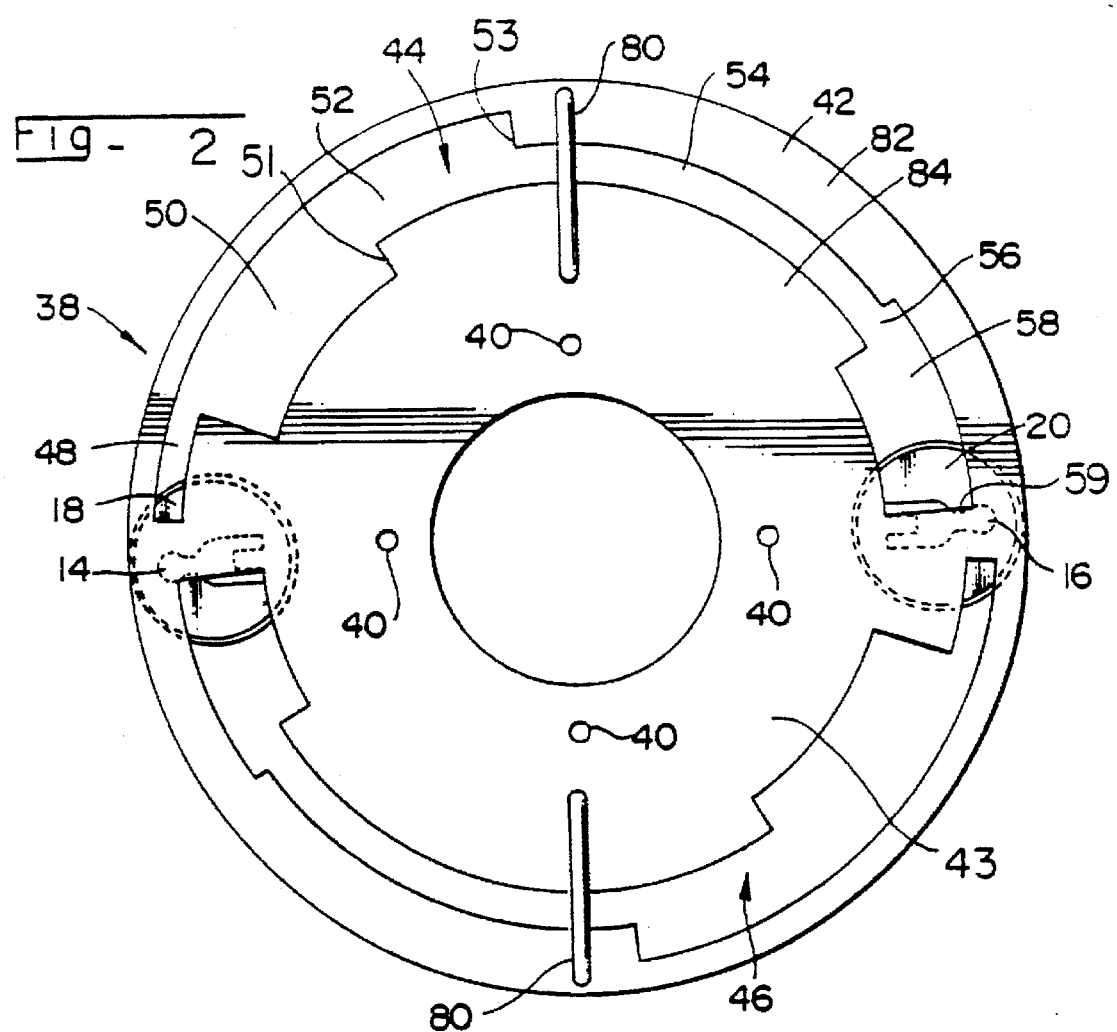
FIG. 2 is a top view of a cutter plate assembly of the extrusion apparatus shown in FIG. 1.
Figure 3:
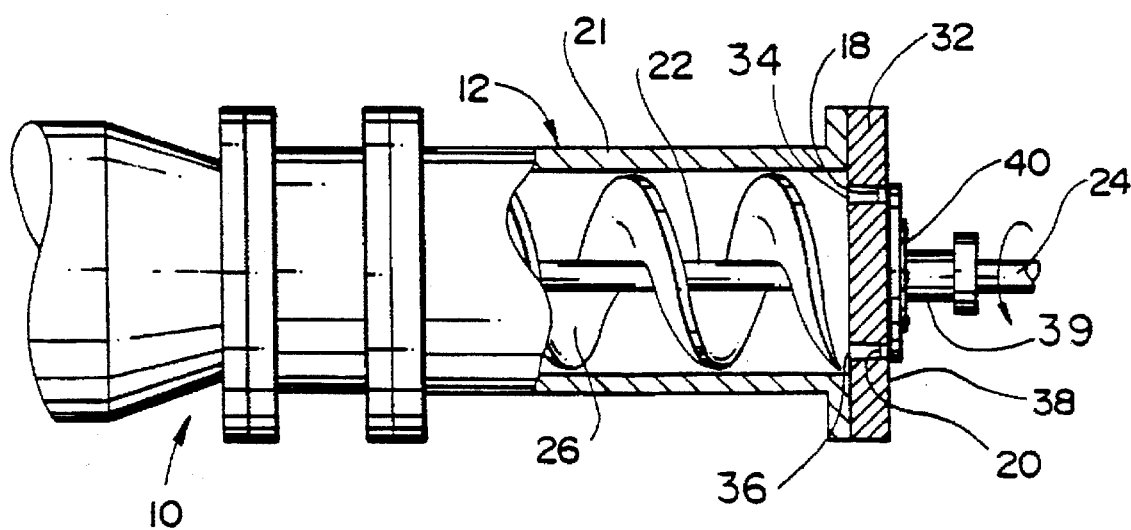
FIG. 3 is a side view of the extrusion apparatus in FIG. 1 with portions broken away to show internal structure.

Turning now to the drawings, FIGS. 1 and 3 illustrate an extrusion apparatus 10 embodying the present invention. The extrusion apparatus 10 includes a conventional extruder 12 which forces material capable of being molded or receiving form such as malleable metal, plastic, or food dough to die openings 14, 16 (FIG. 2) formed in respective dies 18, 20. The extruder 12 includes a generally cylindrical housing 21 containing a rotatable spindle 22 which is driven by an electric motor (not shown). The spindle 22 is positioned along the central axis of the housing 21. A helically-shaped member 26 is mounted to the spindle 22 and extends radially outward from the spindle 22 to a radial position closely adjacent to the inner surface of the housing 21.

Figure 4:
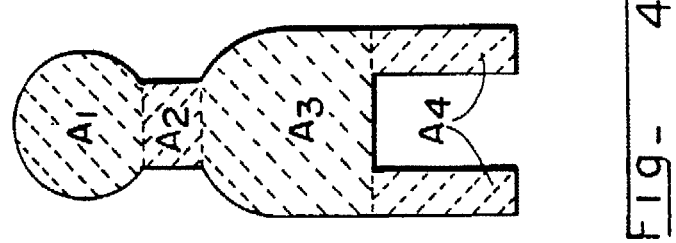
FIG. 4 is a front view of a three-dimensional object produced with the cutter plate assembly shown in FIG. 2.

The extruder 12 further includes a solid frontal section 32 which contains a pair of openings designed to hold dies 18, 20. As is well known, in response to rotation of the spindle 22 the helically-shaped member 26 forces the material capable of being extruded or receiving form within the housing 21 to the dies 18, 20. FIG. 4 shows the shape of the die openings 14, 16.

Referring to FIG. 2, the extrusion apparatus includes a slotted cutter plate 38. The slotted cutter plate is rotatably mounted to the fixed shaft 24 immediately adjacent the solid frontal section 32 of the extruder 12 as shown in FIG. 3. In particular, the cutter plate 38 is attached to a disc-shaped member 41 of a detachable spool 39 by conventional means such as screw, bolts, or the like which pass through apertures 40 (FIG. 2) formed in a cutter plate 38. Rotation of the cutter plate 38 follows the rotation of the spool which is attached to a belt 43 driven by a second motor (belt and motor not shown).

In accordance with the present invention, it is the combination of the initial shaping of extrudable material by extrusion through the die openings 14, 16 and the secondary shaping of the material by rotation of the cutter plate 38 that produces the three-dimensionally shaped objects. Specifically, as the cutter plate 38 rotates in response to the rotation of the spool, different portions of the die openings 14, 16 through which material is being extruded are obstructed at different points in time. The cutter plate 38 rotation serves to precisely shape the material being extruded through the die openings 14, 16.

To block different portions of the die openings 14, 16 at different times, the cutter plate 38 forms a pair of peripheral slots 44, 46. As the configurations of the two slots 44, 46 are identical, only the slot 44 is described in detail herein. The slot 44 includes a plurality of sections 48, 50, 52, 54, 56, and 58. As the cutter plate 38 is rotated, different sections of slot 44 pass over one of the die openings 14, 16. In the position of the cutter plate 38 illustrated in FIG. 2, the slot 44 is about to uncover portions of the die opening 14. Each section of the slot 44 is used to form a different portion of a three-dimensional dog illustrated in FIGS. 4 and 5. For example, section 48 only uncovers the rounded part of the die opening, allowing extruded material to form only the three-dimensional head of the dog. Section 50 uncovers the entire die opening allowing the head, neck, torso and front legs of the dog to be formed. The step 51 formed at the junction between sections 50 and 52 then clearly cuts the back of the dogs front legs as the cutter plate rotates. Section 52 uncovers only the portion of the die opening allowing the head, neck and torso portions of the dog to be formed. The step 53 formed at the junction between sections 52 and 54 of the cutter plate then clearly cuts the back of the dog's head and neck. Section 54, of smaller width than section 52, allows only the torso portion of the dog to be formed. Section 56 is larger and uncovers the portion of the die opening which allows the torso and tail to be formed. Section 58 uncovers the portion of the die opening defining the torso, tail and back legs of the dog. Finally, the trailing edge 59 of section 58 completely separates the individual three-dimensional object, in this case in the shape of a dog, allowing it to fall off onto a collection area below. Since the flow of extruded material and rotation of the cutter plate 38 is continuous, the cycle repeats and more shaped objects are formed until material is no longer extruded from the die opening.

Alternatively, the individual objects need not be completely separated but may instead merely be scored and later completely separated by hand or machine. That alternative would be accomplished if the peripheral slots 44, 46 making up the cutter plate pattern were contiguous, having only a very narrow connecting section between the two peripheral slots making up each separate three-dimensional dog shape. In that alternative embodiment, the die openings would never be completely obstructed by the cutter plate.

Figure 5:
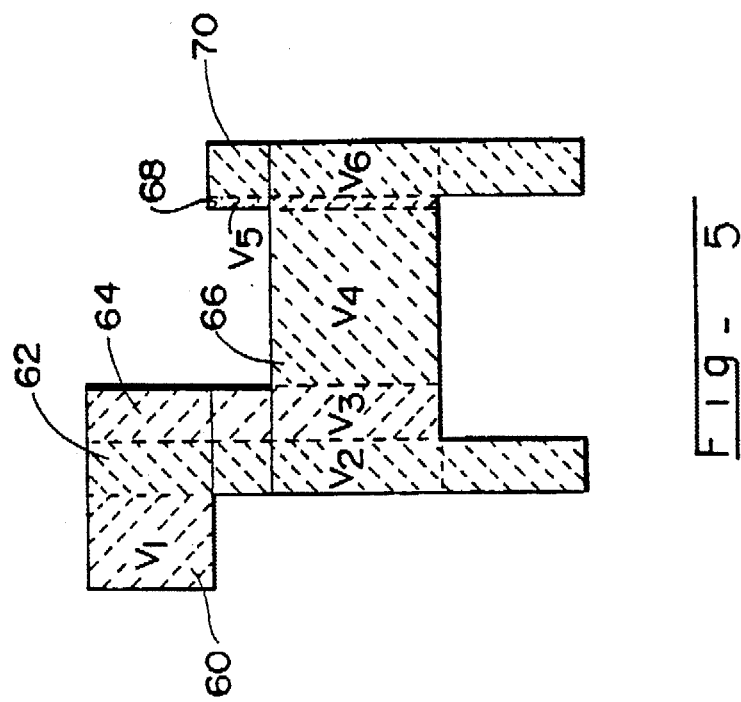
FIG. 5 is a side view of the three-dimensional object produced with the cutter plate assembly shown in FIG. 2.

Referring to FIG. 5, one can see a side view of the three-dimensional dog shape formed by the rotating cutter plate 38 having the slot 44 shown in FIG. 2. The six sections of slot 44, sections 48, 50, 52, 54, 56, and 58 each have different lengths and widths, each section producing different portions of the dog shape 60, 62, 64, 66, 68, and 70 shown in FIG. 5. Specifically, section 48 of slot 44 corresponds to portion 60 of the dog. Section 50 corresponds to portion 62 of the dog. Section 52 corresponds to portion 64 of the dog. Section 54 corresponds to portion 66 of the dog. Section 56 corresponds to portion 68 of the dog. Lastly, section 58 corresponds to section 70 of the dog. Alternatively, the cutter plate 38 can be run in a reverse direction to make the same dog shape but in reverse order of portions created.

As one can see, the complexity of shape of the three-dimensional objects produced by the extrusion apparatus of the present invention depends upon the complexity of, or number of different sections included in, the peripheral slot pattern of the cutter plate 38 and the shape of the die openings or openings located on the distal face of the extruder.

The cutter plate 38 preferably rotates at constant speed. However, one can vary the speed of the cutter plate 38 during each revolution thereof to create objects with different proportions. For instance, to make dog shapes with long torsos one could slow the rotation of the cutter plate 38 through slot section 54.

The extrusion apparatus 10 simultaneously produces four three-dimensional objects during each revolution of the cutter plate 38. Alternatively, one could have a single die or more than two dies located in the solid frontal section 32 of the extruder 12. Also, the cutter plate 38 may contain one or more than two peripheral slots. The number of peripheral slots on the cutter wheel need not correspond to the number of dies. For instance, three dies and two peripheral slots would make six shapes simultaneously. Also, dies located on a single extruder can be of different shapes to simultaneously create two or more different three-dimensional objects.

Replacement of the dies and/or slotted cutter plate 38 will enable the user of the extrusion apparatus 10 to make a multitude of shapes with relative ease.

Braces 80 maintain integrity of the cutter plate 38. They reinforce and stabilize the cutter plate 38 as it rotates. This stabilization is preferable since the slots 44, 46 substantially separate the peripheral portion 42 and central portion 43 of the plate. The braces 80 establish additional connection between this peripheral portion 42 and central portion 43. In FIG. 2 two braces are shown to stabilize the cutter plate 38 having two peripheral slots. The number of braces needed to stabilize the cutter plate 38 depends on the number of peripheral slots and corresponding number of bridges between the external area of the cutter plate 43. Thus, in the case where more than two peripheral slots are present in the cutter plate braces may not be necessary at all.

Any material that is plastic or capable of being extruded or receiving form can be extruded and shaped into three-dimensional objects by the extrusion apparatus of the present invention. For example, such three-dimensional food products as crackers, cookies, puffed snacks, pet foods, pasta, candy, gum and ready-to-eat cereals can be easily produced in mass by feeding appropriate food composition through the extrusion apparatus of the present invention. In addition, metal or polymeric materials can be extruded into three-dimensional shapes to make toys such as game pieces. If desired, the extruder 12 may be replaced with two extruders which separately, but simultaneously, feed different materials to the channels 34, 36.

While the present invention has been described with reference to one or more particular embodiments, those skilled in the art will recognize that many changes may be made thereto without departing from the spirit and scope of the present invention.

For example, the extruder 12 may be substituted with a radial extruder which forces extrudable material in different radial directions through a plurality of ports spaced around a periphery of a cylindrical housing of the extruder 12. Dies with openings formed therein are mounted at outlet ends of the respective ports. With such a radial extruder, the cutter plate is configured in the form of a rotatable cylinder concentric with and surrounding the cylindrical housing of the extruder. The cylindrical cutter plate forms a circumferential slot pattern which exposes different portions of the die openings at different times. However, the three-dimensional object may be prepared by any method of passing a patterned opening in front of a die opening, one particular embodiment of which is demonstrated herein.

Each of these embodiments and obvious variations thereof is contemplated as falling within the spirit and scope of the claimed invention, which is set forth in the following claims.

What is claimed is:

1. An extrusion apparatus for producing a three-dimensionally shaped product, comprising:

at least one die having an opening defining a two-dimensional shape;

an extruder having a mechanism which forces an extrudable material through the opening in the die, the die being disposed adjacent to an outlet end of the extruder; and a cutter plate disposed adjacent to the die, the cutter plate forming a slot having a plurality of sections of variable width and length, the plurality of sections of the slot being configured and arranged to expose different portions of the die opening at different times as the cutter plate moves relative to the opening in the die so as to vary the shape of the extrudable material forced through the opening in the die and thereby create the three-dimensional shape.

2. A rotatable cutter plate assembly for use in producing a three-dimensional shape, the plate assembly can be disposed adjacent to at least one die having an opening defining a two-dimensional shape, said die typically disposed adjacent to an extruder forcing an extrudable material through the opening in the die, the plate assembly comprising:

a cutter plate forming a slot having a plurality of sections of variable width and length, the plurality of sections of the slot being configured and arranged to expose different portions of the die opening at different times as the cutter plate moves relative to the opening in the die so as to vary the shape of the extrudable material forced through the opening in the die and thereby create the three-dimensional shape.

3. A method for producing a three-dimensionally shaped product, said method comprising:

forcing an extrudable material through an opening formed in a die, the opening defining a two-dimensional shape of a three dimensionally shaped product;

moving a cutter plate having a slot pattern defining the third dimensional parameters of the three-dimensionally shaped product, said slot pattern having a plurality of sections of variable width and length, the plurality of sections of the slot being configured and arranged to exposed different portions of the opening formed in the die at different times as the cutter plate moves relative to the opening formed in the die so as to vary the shape of the extrudable material forced through the opening formed in the die to thereby create a three dimensional shape, said cutter plate being disposed adjacent to the opening of the die; and contouring a three-dimensionally shaped product as the cutter plate moves relative to the opening in the die so as to vary the shape of the extrudable material forced through the opening in the die.

* * * * *